J. C. SCHLEICHER.
TIRE FOR VEHICLES.
APPLICATION FILED JULY 23, 1909.

961,374.

Patented June 14, 1910.
2 SHEETS—SHEET 1.

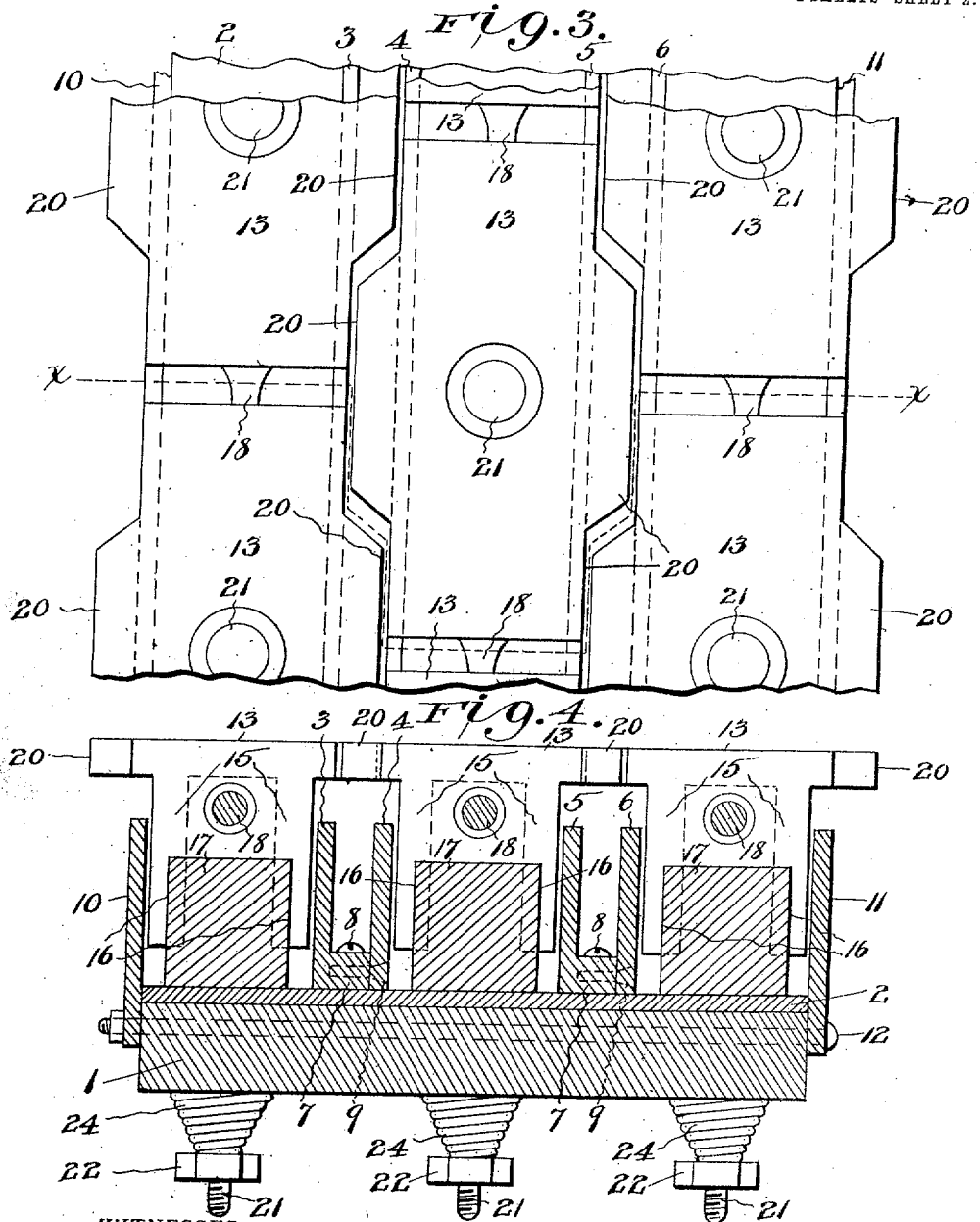

UNITED STATES PATENT OFFICE.

JOHN C. SCHLEICHER, OF MOUNT VERNON, NEW YORK.

TIRE FOR VEHICLES.

961,374.  Specification of Letters Patent.  Patented June 14, 1910.

Application filed July 23, 1909. Serial No. 509,244.

*To all whom it may concern:*

Be it known that I, JOHN C. SCHLEICHER, a citizen of the United States, residing at Mount Vernon, in the county of Westchester and State of New York, have invented certain new and useful Improvements in Tires for Vehicle-Wheels, of which the following is a specification.

My invention relates to tires for vehicle wheels, particularly to a tire adapted for wheels of automobiles or other heavy vehicles.

It has for its object to provide a tire for vehicle wheels which is adapted to be placed on any wheel having the dimensions to fit it, without necessitating any change in the wheel except boring a few holes through the tire and felly.

It has for a further object to provide a tire for vehicle wheels which, when in place on a wheel, will present a metallic tread surface to the ground, yieldable at all points, thus attaining the advantages of the pneumatic tire and advantages over the pneumatic tire without its attendant disadvantages.

It has for a still further object to provide the tire with means whereby it will readily engage and ride over a track.

Figure 1:
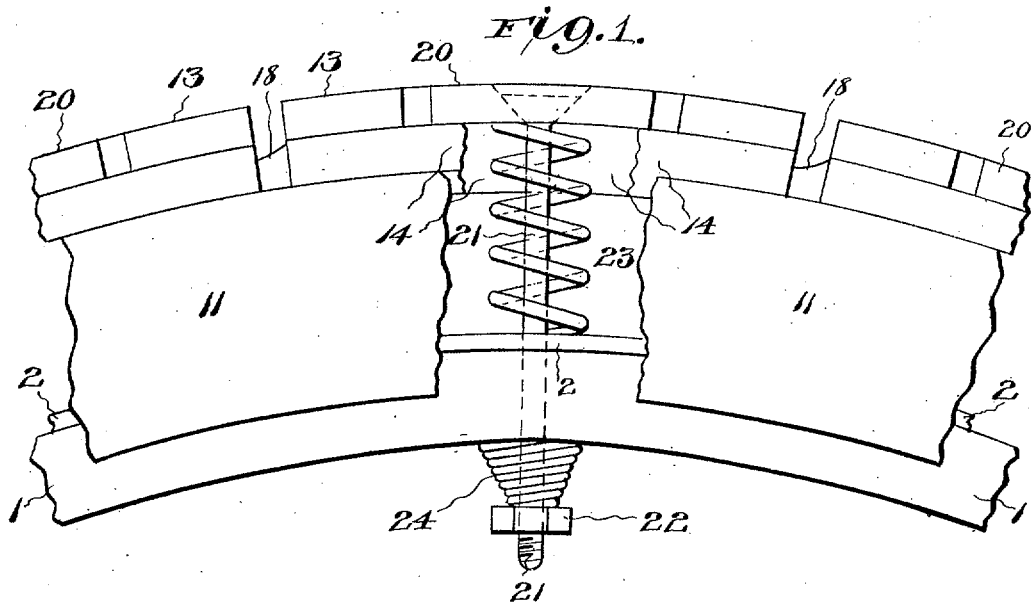
Figure 2:
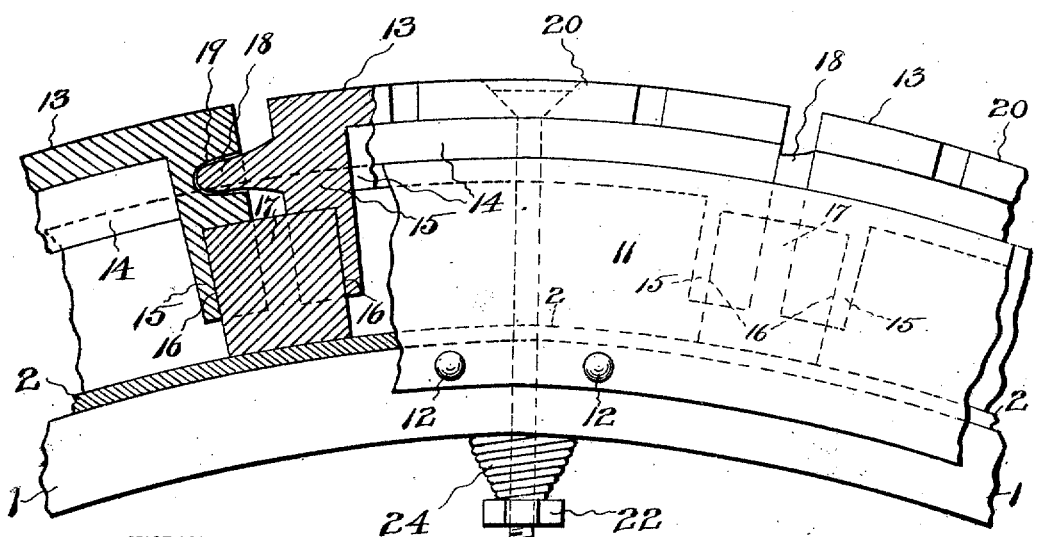

In the drawings illustrating my invention: Figure 1 is a fragmentary side view, partly broken away, of the felly and tire of a vehicle wheel having my tire applied. Fig. 2, a similar view partly broken and sectioned. Fig. 3, a fragmentary plan view of the felly and tire of a vehicle wheel having my tire applied. Fig. 4, a transverse sectional view taken on the line *x—x* of Fig. 3.

Referring to the drawings in which like reference characters designate corresponding parts, 1 designates the felly of a wheel and 2 the tire thereof. Metal rings 3, 4, 5 and 6 are placed on the tire, the rings 3 and 5 having flanges 7 spacing them from the rings 4 and 6 respectively and being secured to the tire by screws 8 passing through said flanges into the tire and felly and the rings 4 and 6 being secured to the flanges of the rings 3 and 5 respectively by screws 9. Metal rings 10 and 11 are secured to the sides of the felly by threaded bolts 12 passing through the felly and having nuts on their ends. In securing the rings in place, the ring 3 is spaced from the ring 10, the ring 4 from the ring 5 and the ring 6 from the ring 11 so that three channels of equal depth and width are formed.

A circular series of metal sections 13 is located in each channel and together form the tread of the tire. Flanges 14 depend from the sides of each section and bear against the inner faces of the rings between which the section is located, thus guiding and preventing it from lateral movement. Legs 15 depend from the ends of each section and are provided with recesses 16 in their front faces, the recesses in the legs at the adjacent ends of adjacent sections receiving the edges of blocks 17, made of rubber or other suitable material, supported on the tire of the wheel, each block thus cushioning and resiliently supporting the adjacent ends of adjacent sections. A lug 18 is provided on one end of each section and a recess 19 in the other end, the lugs engaging the recesses of adjacent sections and joining them loosely together so that pressure exerted on one section will force its adjacent sections inwardly or, in other words, cause joint action thereof. Each section is provided at a central point with laterally extending flanges 20, and as the two outside series of sections are staggered with relation to the central series, the lateral inside flanges of the two outside series of sections come opposite the meeting points of the inside series of sections and the lateral flanges of the inside series of sections come opposite the meeting points of the two outside series of sections. The purpose of the lateral flanges of the sections is to provide means for readily engaging a rail and riding over it.

A threaded bolt 21 extends through the center of each section of each series and through the tire and felly of the wheel, the head thereof seating in a countersink in the section and its end having a nut 22 thereon. Between the under surface of each section and the upper surface of the wheel tire 2, and encircling the outer end of the bolt, which extends through the section, is located a normally open spiral spring 23 which supplements the action of the cushions in resiliently supporting the section upon the wheel.

Between the under surface of the felly and the nut and encircling the inner end of the bolt, which extends through the section, is located a normally closed spiral spring 24 which serves to keep the head of the bolt always seated in the countersink of the section. By turning the nuts on their bolts, the extent of outward movement of the sections is regulated.

It will be readily understood that when a tire constructed as above described, is placed upon a wheel, it will instantly yield at the points of contact with the ground, when a load is placed upon it, and also instantly yield when receiving a shock from contact with an obstacle and when relieved from the pressure occasioned by the load or shock, will instantly return to normal position.

I do not desire to be understood as limiting myself to the specific details of construction and arrangement as herein described and illustrated, as it is manifest that variations and modifications may be made in the features of construction and arrangement, in the adaptation of the device to various conditions of use without departing from the spirit and scope of my invention and improvements. I therefore reserve the right to all such variations and modifications as properly fall within the scope of my invention and the terms of the following claims.

I claim:—

1. A tire for vehicle wheels having a tread comprising resiliently supported sections provided with alternate lateral recesses and projections, the tread surfaces of said sections and projections being flush, substantially as described.

2. A tire for vehicle wheels having a tread comprising a plurality of parallel series of resiliently supported sections provided with alternate lateral recesses and projections, the tread surface of each section and its projections being flush and the projections and recesses of adjacent series engaging when the tread surfaces of the sections of said series are flush, substantially as described.

In testimony whereof I have signed my name in the presence of two subscribing witnesses.

JOHN C. SCHLEICHER.

Witnesses:
 Jos. T. MULLIGAN,
 A. L. RANDOLPH.